May 15, 1923.

Re. 15,606

A. BOWSER

LIQUID DISPENSING APPARATUS

Original Filed Oct. 4, 1918 2 Sheets-Sheet 1

Inventor
C. H. Bolens & C. S. Fair
Administrators of the estate of
Augustus Bowser, deceased
By Watson Cole Grosvenor & Gundle
Att'ys May 15, 1923.
Re. 15,606
A. BOWSER
LIQUID DISPENSING APPARATUS
Original Filed Oct. 4, 1918 2 Sheets-Sheet 2
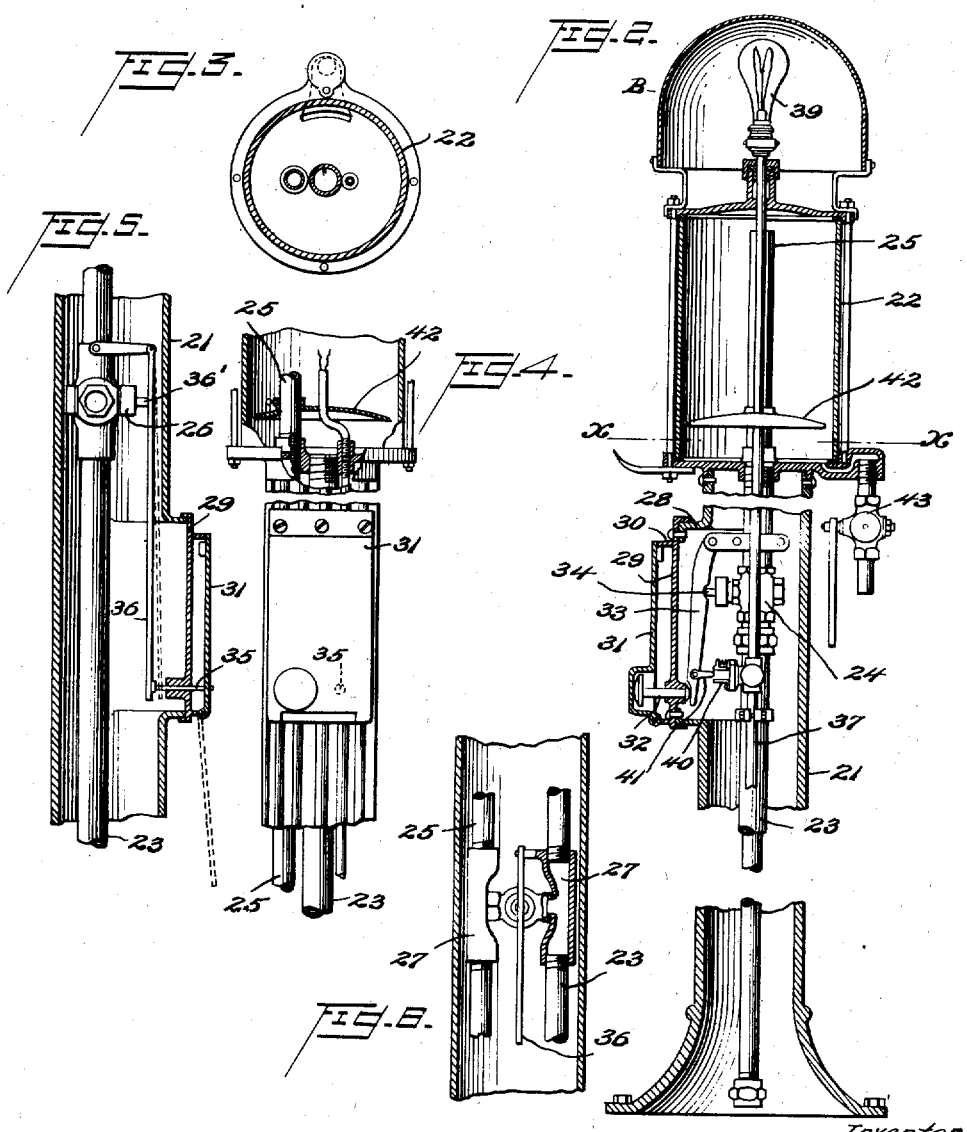
Inventor
C. H. Bolens & C. S. Fair
Administrators of the estate of
Augustus Bowser, deceased.
By Watson Cole Grindle & Watson
Att'ys Reissued May 15, 1923. Re. 15,606

UNITED STATES PATENT OFFICE.

AUGUSTUS BOWSER, DECEASED, LATE OF FORT WAYNE, INDIANA, BY COITE H. BOLENS AND CHARLES S. FAIR, ADMINISTRATORS, OF FORT WAYNE, INDIANA.

LIQUID-DISPENSING APPARATUS.

Orignal No. 1,316,557, dated September 23, 1919, Serial No. 256,795, filed October 4, 1918. Application for reissue filed January 25, 1921. Serial No. 439,881.

*To all whom it may concern:*

We it known that AUGUSTUS BOWSER, deceased, formerly residing at Fort Wayne, in the county of Allen and State of Indiana, did invent certain new and useful Improvements in Liquid-Dispensing Apparatus, of which the following is a specification.

This invention relates to improvements in liquid dispensing apparatus and the object thereof is to afford facilities by means of which gasolene and oils or other liquids may be dispensed in definite quantities without the necessity of operating a pump.

The object of the invention is accomplished by the construction illustrated in the accompanying drawings, in which:—

Figure 2 is a side elevation in vertical section showing a dispensing head, portions being cut away;

Figure 3 is a transverse section of Figure 2 on the line $x$—$x$ thereof;

Figure 4 is a detail view showing a front elevation of a portion of a dispensing head;

Figure 1:
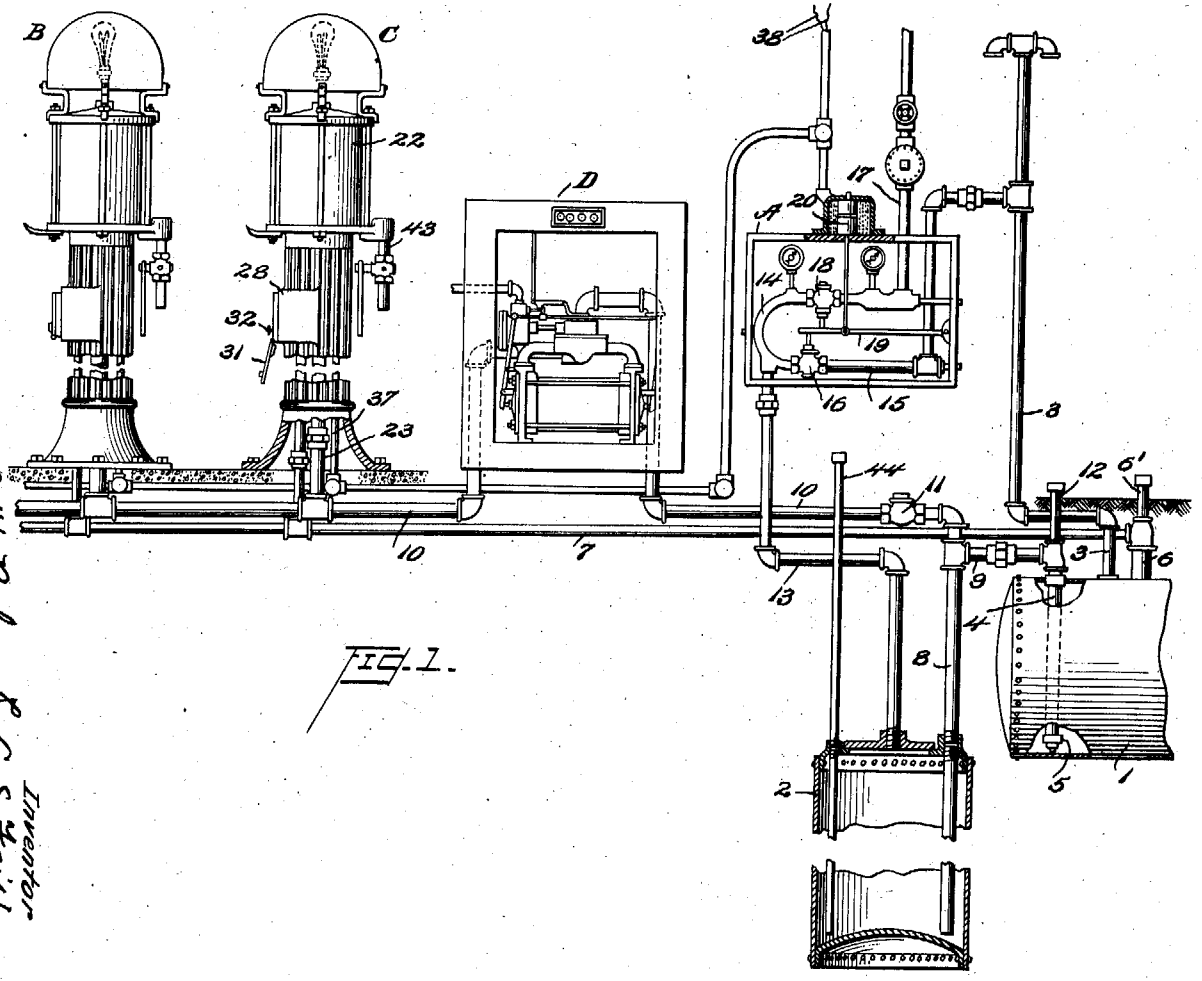
Figure 1 is an elevation showing a general arrangement of parts constituting a complete installation, portions being cut away and in section.

Figure 5 is a vertical section through a part of the supporting stand for the head, the plane being at right angles to that of Figure 4, showing a by-pass valve arranged in connection with the supply-pipe and showing also the operating lever for the valve; and Figure 6 is a detail view showing the by-pass valve arranged in connection with the supply-pipe and overflow pipe and showing also the operating lever, a portion of the view being in vertical section.

Similar numerals of reference indicate corresponding parts throughout the several views and referring now to the same:—

1 is a reservoir for holding a supply of liquid, and 2 is an auxiliary tank situated in a plane lower than the reservoir. A vent-pipe 3 has communication with the reservoir at the top thereof, and a discharge pipe 4 extends into the reservoir and is provided with a foot-valve 5 at its lower end. A fill-pipe 6 has communication with the reservoir at the top thereof and through which the reservoir is recharged, there being an extension 6′ connected with the fill-pipe proper. A drain-pipe 7 has communication with the fill-pipe 6 and is used for the return of surplus liquid.

A discharge pipe 8 extends into the auxiliary tank and has communication with the lower part thereof, and has connection with the discharge pipe 4 of the reservoir through the medium of a connecting pipe 9. A supply-pipe 10 of the dispensing apparatus has communication with the discharge pipe 8 through a check-valve 11. The auxiliary tank is supplied with liquid from the reservoir through the pipes 4, 9 and 8 which function as a siphon, there being an extension-pipe 12 connected with the discharge-pipe 4 through which the siphon may be primed by supplying a sufficient initial quantity of liquid to establish action in the siphon. The auxiliary tank has in communication with its upper end an air-pipe 13 through which air-pressure is applied for expelling liquid from the tank, the liquid passing out through the discharge pipe and check-valve 11 into the supply-pipe 10 when the pressure is applied. The pipe 13 also serves as an exhaust pipe when the tank is being refilled. The air is applied and exhausted through the medium of a controlling mechanism A having connection with the air-pipe 13. The controlling mechanism is comprised of a manifold 14 having communication with the air-pipe 13 and also with an exhaust pipe 15 through an escape-valve 16. An air supply pipe 17 has communication with the manifold through a throttle-valve 18. The throttle-valve and the escape-valve are operated simultaneously by a lever 19 which is actuated by means of an electro-magnet 20. The exhaust-pipe may, if so desired, be connected with the vent-pipe 3 so that the latter will convey the exhaust to its final discharge. B and C are discharge heads through which the liquid is dispensed, and D is a meter having connection with the supply-pipe 10 for ascertaining the quantity of liquid passing therethrough. The particular construction of the meter is immaterial to the present invention as any other suitable meter may be employed instead of that shown. Each of the dispensing heads is comprised of a supporting stand 21 upon the top of which is supported a vessel 22 the vertical walls of which are of transparent material, such as glass. The vessel has a supply-pipe 23 leading from its bottom and which has a throttle-valve 24 in connection therewith for controlling the flow of liquid therethrough. The pipe 23 has connection with the main supply pipe 10. The vessel 22 has also an overflow pipe 25, that communicates with the upper portion of the vessel and extends down through the stand 21 in parallel relation with the supply-pipe 23. Located conveniently within the stand is a by-pass valve 26 connecting the supply-pipe 23 and the overflow pipe 25 through the medium of suitable T-connections 27.

In the front of the stand is a chambered protuberance 28 having a lid 29 for closing the same, and the latter has a flange 30 extending outwardly with a lid 31 hinged thereto. A push-button 32 is mounted with its stem extending through the lid 29 so as to engage an operating lever 33, the latter having bearing connection against the stem 34 of the valve 24. A pin 35 also is slidably mounted in the lid 29 with its inner end bearing against an operating lever 36 which is pivotally mounted and has also bearing relation against the stem 36 of the by-pass valve 26. The pin 35 is so proportioned that when the lid 31 is in closed position the valve 26 will be held open through the medium of the lever 36 and the pin 35, thus permitting the content of the vessel 22 to pass out through the upper part of the supply-pipe 23 and the by-pass valve into the overflow pipe. Also the lid 31 incloses the push-button 32 so that it may not be operated without opening the lid.

A conduit 37 extends up through the stand 21 and leads to the magnet 20 and contains wires 38 for exciting the magnet and for supplying a lamp 39 at the top of the dispensing head. An electrical switch 40 is arranged in connection with the conduit and is adapted to be closed by a plug 41 that is mounted upon the operating lever 33 when the latter is pressed inwardly by applying pressure to the push-button 32. A baffle-disk 42 is mounted within the lower part of the vessel 22 over the upper end of the supply-pipe 23 and is for the purpose of causing the liquid to rise evenly as the vessel is being filled. A discharge nozzle 43 has communication with the lower end of the vessel 22 through which the liquid is finally dispensed.

It is the intention that the electrical wires will have connection with a suitable source of energy, and the pipe 17 will have connection with a suitable source of air under pressure. The pipe 44 communicating with the lower part of the auxiliary tank 2 is used for the purpose of extracting foreign matter that may accumulate in the bottom of the tank.

In the operation of the invention the reservoir is charged through the fill-pipe 6, and also the tank 2 and the siphon are initially filled through the pipe 12. By pressing upon the push-button 32 the switch 40 is closed and the valve 24 is opened through the medium of the lever 33 so that the magnet becomes excited with the effect that the lever 19 becomes drawn upwardly, which movement opens the air-valve 18 and permits the exhaust-valve 16 to close. Thus, air-pressure enters though the pipe 13 into the tank 2, which forces the liquid contained therein out through the discharge pipe 8, the supply-pipes 10 and 23, into the vessel 22. This operation is continued until the vessel is filled to the level of the overflow pipe opening. The push-button is then released, the switch thereby is opened and the valve 24 is closed. Any surplus liquid flows down through the overflow pipe 25 and is carried back to the fill-pipe 6 through the pipe 7. When the switch is opened the magnet 20 drops to its normal position, together with the lever 19, causing the air-valve 18 to close and the exhaust-valve 16 to open, so that the air introduced into the tank 2 is released and discharged through the exhaust-pipe 15. When thus released of air-pressure the tank becomes automatically refilled through the siphon. The liquid contents of the vessel is then dispensed through the nozzle 43 in such quantities as desired. The vertical walls of the vessel, being of glass, admits observation of the liquid as it enters the vessel and as it is removed therefrom, and the patron is thus permitted to ascertain the quantity of liquid purchased.

When the operation of the apparatus is to be temporarily suspended, the lid 31 is closed and locked thus concealing the push-button, and the by-pass valve is thereby held open by the pressure of the door against the pin 35 which actuates the valve through the medium of the lever 36. The contents of the vessel thereby is permitted to drain through the feed-pipe and valve into the overflow pipe 25.

What I claim is:

1. In dispensing apparatus of the class described, including a reservoir and an auxiliary tank and a siphon arranged for supplying the latter from the former, the siphon having a foot-valve, a dispensing head including a stand and a transparent measure and an overflow pipe for the measure communicating with the reservoir, a supply pipe extending through the stand and having a throttle-valve located therein, means for alternately supplying air under pressure to the auxiliary tank and releasing it therefrom and including an electric switch for controlling the same located in the stand, and means for simultaneously actuating the throttle-valve and switch.

2. In apparatus of the class described, in combination, a measuring vessel, a supply conduit communicating with said vessel, a valve controlling the flow of fluid in said conduit, a drain for said vessel, a valve controlling said drain, and a member movable to operate one of said valves and during part of its movement adapted to render the other valve inoperable.

3. In apparatus of the class described, a supply pipe and a measuring vessel, means for supplying liquid through the supply pipe to the vessel, means for controlling the supply, a closure for preventing access to said controlling means and means automatically set in operation by said closure when brought to closed position for draining said vessel.

4. In apparatus of the class described, in combination, a measuring vessel, a supply conduit communicating with said vessel, a valve controlling the flow of fluid in said conduit, a drain for said vessel, a valve controlling said drain, and a member movable to a position to render the supply valve inoperable and to actuate the drain valve by such movement.

5. In apparatus of the class described, a supply-pipe and a measuring vessel; an overflow-pipe for the vessel; means for supplying liquid through the supply-pipe to the vessel, a by-pass valve having connection between the overflow pipe and the supply-pipe adapted for draining the vessel, means for permitting or preventing the manual setting in operation of said liquid supply means, and automatic means for opening said by-pass valve when said means is set to prevent such operation.

6. In apparatus of the class described, a supply-pipe and a measuring vessel; an overflow-pipe for the vessel; means for supplying liquid through the supply-pipe to the vessel, a by-pass valve having connection between the overflow pipe and the supply-pipe adapted for draining the vessel, a manually controlled part for causing the operation of said liquid supply means, a closure for preventing operative access to said part, and means in the path of said closure so connected to said by-pass valve as to automatically open the same when moved to closed position.

7. In apparatus of the character described, a cabinet having a movable door, a measuring vessel, means for supplying liquid to said vessel, means for dispensing the liquid from said vessel, a drain valve having communication with the vessel, a member connected with the drain valve disposed in the path of movement of said door so that the drain valve is operated by the door, and means to control the operation of the liquid supply disposed to be inaccessible when the door is shifted to a selected position.

8. In a liquid dispenser, a cabinet having a movable door, a liquid accumulating receptacle, means for supplying liquid to the receptacle, means for dispensing liquid from the receptacle, drain means having communication with the receptacle, and an operative connection between the drain means and the door.

9. In a liquid dispenser, a cabinet having a movable door, a liquid accumulating receptacle, means for supplying a liquid to the receptacle, an element to actuate the supply means, means for dispensing the liquid from the receptacle, a drain valve having communication with the receptacle, and means for connecting the drain valve with the door so that the drain valve is operated by the movement of the door, said door having a part to prevent the operative movement of the supply means actuating element until the door is shifted to a selected position.

10. In apparatus of the class described, a supply-pipe and a measuring vessel; an overflow pipe for the vessel; means for supplying liquid through the supply-pipe to the vessel; a by-pass valve having connection between the overflow pipe and the supply-pipe adapted for draining the vessel, means for closing the apparatus against normal operation and automatic means for opening said by-pass valve when the apparatus is closed against normal operation.

COITE H. BOLÉNS,
CHARLES S. FAIR,
*Administrators of Augustus Bowser, deceased.*